April 21, 1959 R. K. BRAUN 2,883,119
ARMATURE WINDING HEAD FOR ARMATURE WINDING MACHINES
Filed July 11, 1955 3 Sheets-Sheet 1
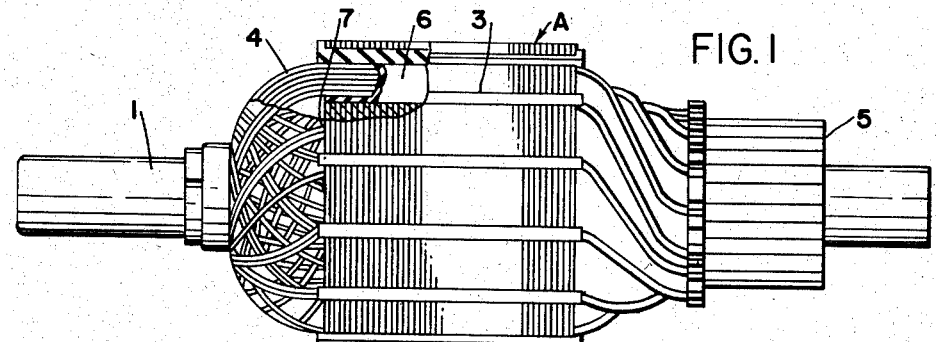
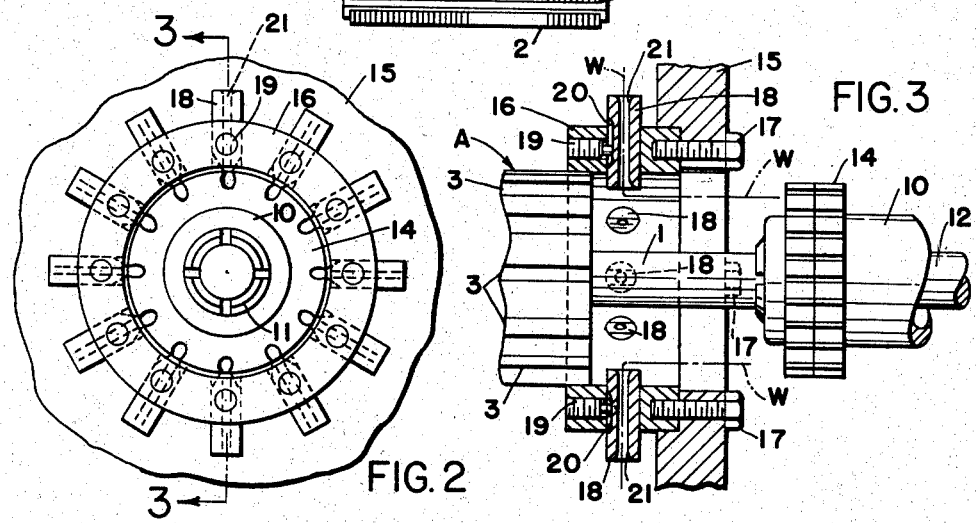
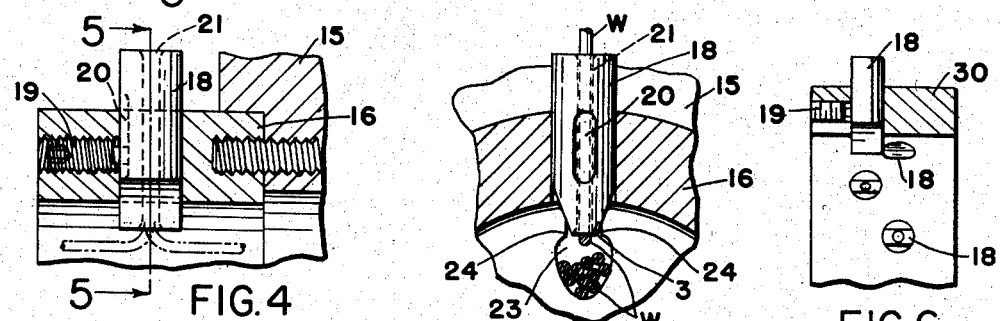
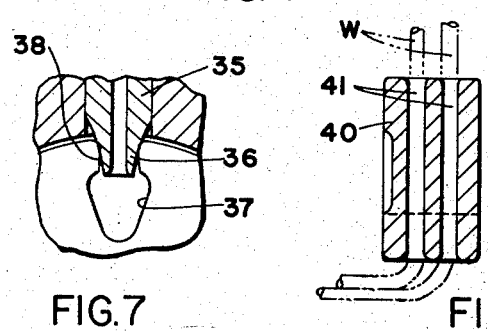
INVENTOR.
RALPH K. BRAUN
BY
Oberlin & Limbach
ATTORNEYS

*INVENTOR.*
RALPH K. BRAUN
BY
Oberlin & Limbach
ATTORNEYS

April 21, 1959  R. K. BRAUN  2,883,119
ARMATURE WINDING HEAD FOR ARMATURE WINDING MACHINES
Filed July 11, 1955  3 Sheets-Sheet 3

*INVENTOR.*
RALPH K. BRAUN
BY
*Oberlin & Limbach*
ATTORNEYS

United States Patent Office 2,883,119
Patented Apr. 21, 1959

2,883,119

ARMATURE WINDING HEAD FOR ARMATURE WINDING MACHINES

Ralph K. Braun, Cleveland, Ohio, assignor to Cleveland Electrical Equipment Co., Inc., Cleveland, Ohio, a corporation of Ohio Application July 11, 1955, Serial No. 520,996

3 Claims. (Cl. 242—13)

The present invention relates generally as indicated to an armature winding head for armature winding machines, and more particularly to a winding head which is adapted for use in machines of the type disclosed in the William P. Hunsdorf Patents 2,381,750 and 2,632,603, granted August 7, 1945, and March 14, 1953, respectively, and in his copending application Serial No. 136,767, filed January 4, 1950, Patent No. 2,718,359.

In armature winding machines of the character indicated, the armature to be wound is alternately reciprocated and rotated with respect to a winding throat to simultaneously wind armature coils in paired series of longitudinal wire-receiving slots formed in the armature body and across the opposite ends of said body. These movements of the armature are effected as by means of a chuck shaft in which the armature shaft is gripped and which is alternately reciprocated and rotated to reciprocate and rotate the armature gripped thereby with respect to the winding throat formed by radially inwardly extending wire feed fingers through which the wires are fed into the wire-receiving slots and across the ends of the armature body.

As apparent, the overhang of the armature with respect to the chuck shaft, and uneven wire tension tends to pull the armature eccentrically from a desired true, coaxial position with respect to the winding throat. Moreover, unless the inner ends of the wire feed fingers extend into the armature slots to a depth approximately equal to or greater than the depth of the narrow portion of the slots, the wires are apt to be caught on the corners defined between the wide and narrow portions of the slots or are apt to be stripped of their insulation during the roll-over or rotation of the armature with respect to the winding throat.

It is one principal object of this invention to provide an armature winding machine of the character indicated having an armature winding head which accurately guides both the reciprocating and the rotary movements of the armature so as to insure coaxial disposition of the armature in the winding head at all times during the coil winding steps for achieving uniform, accurate, and balanced windings.

It is another object of this invention to provide an extremely simple, but efficient, form of winding head which essentially comprises a ring of inside diameter substantially equal to the outside diameter of the slotted armature body and formed with radial holes through which the wire feeding fingers extend, the latter having tapered ends to extend into the armature slots to the required depth aforesaid.

It is another object of this invention to provide a winding head of the character indicated above wherein the wire feed fingers are radially adjustable to accommodate different widths and depths of armature slots.

It is another object of this invention to provide a winding head as aforesaid in which the radially positioned wire feed fingers are mounted for periodic radial inward and outward movements as may be desired in connection with an automatic wire gripping and cut-off mechanism.

Another object of this invention is to provide a winding head in which the radial wire feed fingers are axially staggered so as to achieve a compact winding with less end build-up of the coils wound on the armature.

Another object of this invention is to provide a winding head which enables convenient winding of armatures having skew slots and which has axially staggered wire feed fingers operative to produce compact windings with less end build-up of the coils wound on the armature.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation view, partly in cross-section, showing a typical armature such as is employed in an automobile generator;

Fig. 2 is a front elevation view of one form of the present winding head;

Fig. 3 is a cross-section view taken substantially along the line 3—3, Fig. 2;

Fig. 4 is an enlarged cross-section view radially through the winding head itself;

Fig. 5 is a fragmentary cross-section view taken substantially along the line 5—5, Fig. 4;

Fig. 6 is a fragmentary radial cross-section view showing a modified form of winding head in which the wire feed fingers are staggered axially;

Fig. 7 is a cross-section view similar to Fig. 5 except showing a different form of tapered end on the wire feed finger to enable positioning of the finger to extend down to the wide part of an armature slot in which the narrow part is of substantially greater depth than shown in Fig. 5;

Fig. 8 is a cross-section view axially through another form of wire feed finger having two holes therethrough for feeding a corresponding number of wires;

Fig. 9 is a bottom plan view of the Fig. 8 finger;

Figure 10:
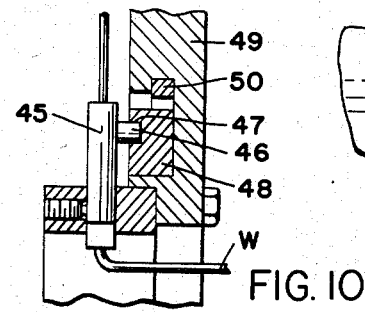
Fig. 10 is a fragmentary cross-section view showing a winding head according to the present invention in which the wire feed fingers are radially reciprocably mounted.

Broadly, the present invention comprises the provision of a set of simple winding heads adapted to be interchanged, one for another, in a matter of a minute or less to adapt the armature winding machine for winding a different type or size of armature. These winding heads each comprise a ring formed with radially disposed holes in which wire feed fingers are adjustably mounted, whereby as an armature is axially reciprocated and rotated with respect to such finger-ring unit, wires pulled through the fingers are wound into coils. Because these basic movements of the armature, that is, alternate reciprocation and rotation, can be effected by numerous mechanisms, no particular one is herein shown.

Referring now more specifically to the drawings, and first to Fig. 1, the armature "A" there shown comprises a shaft 1 on which a laminated, longitudinally slotted body 2 is secured and into the slots 3 of which coils 4 are adapted to be wound to extend through a pair of slots and across the opposite ends of the slotted body. After the wire coils 4 have been wound, a commutator 5 is mounted on the armature shaft 1 and the leads of the coils are secured to the commutator bars. The slots 3 of the armature body 2 may be lined with insulating material 6, and in order to hold the coils in place, suitable wedges 7 may be inserted between the wire coils and the narrow portions of the slots.

For a more complete understanding of the armature winding machine as a whole, reference may be had to the previously mentioned Hunsdorf patents and application; but, in any event, the same basically comprises a power plant (mechanical, electrical, hydraulic, or pneumatic) operative to alternately axially reciprocate the chuck shaft 10 and to rotate the same about its longitudinal axis. Said chuck shaft 10 is equipped with a collet 11 in which the armature shaft 1 is adapted to be inserted and gripped. The collet 11 may be actuated in known manner as by means of the draw rod 12.

The chuck shaft 10 may have mounted thereon a slotted wire gripping and cutting mechanism 14, the details thereof being disclosed in the aforementioned Hunsdorf application. Essentially, such wire gripping and cutting mechanism 14 comprises adjacent rings formed with axial slots around the periphery thereof in number and in angular position corresponding to the slots in the armature A to be wound.

The slotted rings are preferably arranged so that, in one relative rotary poistion thereof, wires are gripped thereby, and in another relative rotary position, wires therein are cut to release the wound armature while the adjacent portions of the wires are gripped preparatory to insertion of the next armature A into the collet 11.

Adjacent to the end of the chuck shaft 10, the machine has a fixed plate 15 to which a ring 16 is secured as by means of bolts 17. Said ring 16 is formed with a series of radial holes therethrough corresponding in number and in position to the slots of the armature A to be wound.

Fitted into said holes are radially extending wire feed fingers 18, said fingers being radially adjustably secured to ring 16 by means of set screws 19 or the like which engage in the grooves 20 formed in the respective feed fingers. Each feed finger 18 is preferably of cylindrical form and has a central opening 21 longitudinally therethrough through which a wire W is adapted to be fed, and the inner end of said opening is smoothly flared or rounded in every direction to enable smooth passage of the wire W therefrom as it is being wound through the armature slots 3 and across the end of the armature body 2.

The armature A aforesaid may have wire-receiving slots 3 therein of the general type shown in Fig. 5, including a narrow portion 3 and a wider portion 23, and in order to prevent the wires W from catching on the corners 24 where the wide portions 3 join the narrow portions 23, the wire feed fingers 18 must extend into the narrow portions 3 of the slots to a position generally flush or inward of such corners 24 in order that the wires W fed from the inner ends of the fingers will be disposed within the wide portions 23 of the slots. Therefore, during the roll-over operation of the armature A, the wires will clear such corners 24 and will be pulled down into the wide portions 23 of the slots.

In general, the taper of the inner end of each finger 18 may be approximately 60° (included angle) and the inner end must be blunt, as shown, so as to enable the rounding of the opening 21 as aforesaid.

In the form of the invention illustrated in Figs. 2 to 5, the radially disposed wire feed fingers 18 are located in a single plane midway between the ends of the ring 16, the length of the ring 16 being such that, when the armature A is reciprocated, at least about ¼" of the length of the slotted body 2 thereof will remain in guided engagement with the inside diameter of the ring.

The inside diameter of said ring 16 may be approximately the same as the outside diameter of the slotted armature body 2, and in order to accommodate tolerance variations, said inside diameter of the ring is usually made approximately .005" larger in diameter than the diameter than the diameter of the armature body 2.

Referring now to Fig. 6, the winding head 30 therein disclosed is generally the same as that of Figs. 2 to 5 except that alternate wire feed fingers 18 held in place by the set screws 19 are axially staggered as shown. It has been found that, by so staggering the wire feed fingers, the wires fed therethrough and laid across the ends of the armature body are disposed more in side-by-side relation so as to result in a compact winding with less end build-up than otherwise results when the wire feed fingers are in a single plane as in Fig. 3.

In Fig. 7, there is illustrated a slightly modified form of wire feed finger 35 which has an inner tapered end 36 in which the tapered surfaces are concavely curved so that the inner end of the finger will reach down into the armature slot 37 the required distance when the armature has a relatively deep, narrow slot portion 38.

In Figs. 8 and 9, there is illustrated still another form of wire feed finger 40 which is provided with a pair of wire feed openings 41 disposed along side each other, and each hole is smoothly rounded or flared at its inner end to allow smooth feeding of the wires W into the armature slots and across the ends of the armature body.

Figure 11:
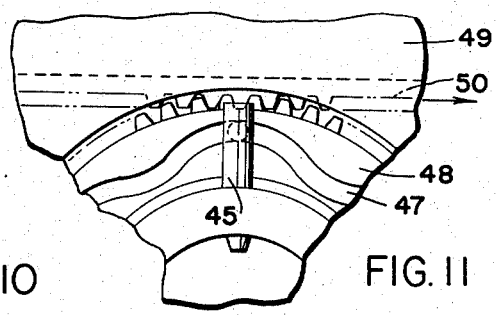
Fig. 11 is a fragmentary elevation view as viewed from the left-hand side of Fig. 10.

With respect to Figs. 10 and 11, it has been found desirable in some instances to move the wire feed fingers 45 radially inward and outward, and for this purpose each wire feed finger is provided with a laterally extending pin 46 screwed or otherwise secured thereinto, said pin extending into a cam groove 47 of a ring 48 which is adapted to be oscillated in the machine head 49 as by means of a reciprocating gear rack 50 or other equivalent means.

Thus, at the conclusion of the armature winding operations, the wire feed fingers 45 may be moved radially inward to properly position the wires W in the slots of a wire gripping and cutting mechanism like 14 for cutting off of the wires to release the wound armature A but yet to grip the wires W which extend from the cutting and gripping mechanism 14 through the wire feed fingers 45 to the wire supply spools.

From the foregoing it can be seen that the present invention relates to an armature winding machine of the character wherein a plurality of wires W are simultaneously wound into the slots of the armature A and across the ends of the armature by alternately reciprocating and rotating the chuck shaft 10 in the collet 11 of which the armature shaft 1 is gripped with respect to the fixed plate 15. The wires W extending inwardly through the feed fingers 18 of the ring 16 affixed to plate 15 and secured to the wire gripping and cutting mechanism forms a winding throat through which the armature A is thus reciprocated and rotated to lay the wires W into the armature slots and across the ends of the armature.

Figure 12:
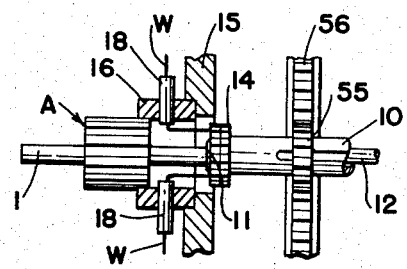
Figs. 12 to 18 are schematic diagrams showing the successive steps in the winding of an armature in a machine embodying the present winding head.

Referring now to the operation of the machine embodying the present winding head improvements, the chuck shaft 10 may be disposed in the Fig. 12 position on the rear side of the winding head 16, and the wires W are gripped in the cutting and gripping mechanism 14 and extend therefrom in generally cylindrical form to the wire feed fingers 18 and through the latter to wire supply spools (not shown). In this position of the parts, the armature A to be wound may be inserted into the ring 18 with its shaft extending into the collet 11. The draw bar 12 is then actuated to close the collet upon the armature shaft.

Figure 13:
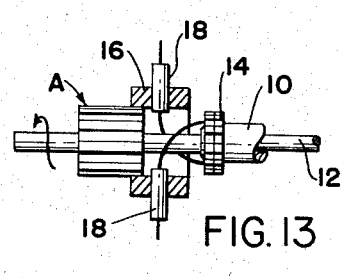
Figure 14:
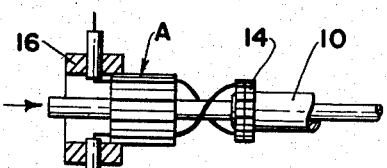

Usually the first step, after insertion and gripping of the armature A, is to rotate the chuck shaft 10 and the armature A gripped thereby a part-turn, and this may be effected by any of a variety of different mechanisms and is herein exemplarily shown as comprising a gear 55 slidably keyed on the chuck shaft 10 and meshing with a longitudinally reciprocable gear rack 56. Such roll-over of the chuck shaft 10 and armature A will cause the wires W to be wrapped around the armature shaft as is shown in Fig. 13.

Figure 15:
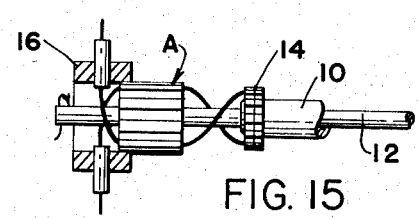
Figure 16:
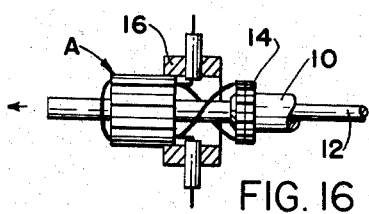

Then the chuck shaft 10 is reciprocated toward the right whereby the wire feed fingers 18 pass through the armature slots 3 laying the wires W thereinto. After the slotted body of the armature A has passed to the righthand side of the wire feed fingers 18, the chuck shaft 10 and armature A are again rotated a part-turn to lay the wires W across that end of the armature A as is shown in Fig. 15.

The chuck shaft 10 and armature A is then moved toward the left to lay the wires W into the armature slots 3, and then, after the slotted body of the armature has passed to the left side of the wire feed fingers 18, the chuck shaft 10 and armature A are again rotated in a part-turn to lay the wires across the corresponding end of the armature body. Such reciprocatory and part-turn rotations of the armature A are continued until the coils wound thereon have the desired number of turns.

It is to be noted that, in all of the winding positions, Figs. 13 to 16, the reciprocatory and rotary movements of the armature A are accurately guided by reason of the close sliding fit of the ring 16 around the armature body.

Figure 17:
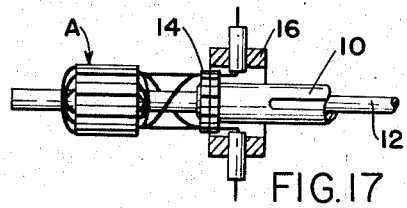

After the armature has been wound with wire coils having the desired number of turns, the chuck shaft 10 is moved toward the left to position the wire gripping and cutting mechanism 14 on the same side of the winding throat as the wound armature. Thus, the wires from the feed fingers 18 are layed into the slots of said mechanism 14 as is shown in Fig. 17, for example.

Finally, the wires W initially gripped in said mechanism 14 are released, and the wires constituting the last turn of each coil are cut by said mechanism 14, whereby the wound armature A may be pulled away from the machine upon opening of the collet 11. The other ends of the cut wires W are gripped in said mechanism 14 and, in effect, form hooks as is shown in Fig. 18 when the chuck shaft 10 is moved from the Fig. 18 position to the starting position of Fig. 12.

Figure 18:
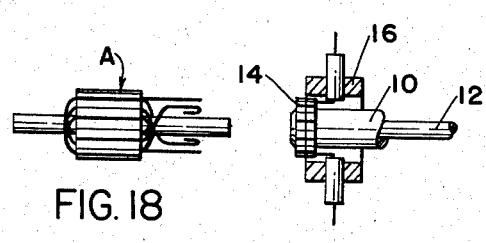

When the Figs. 10 and 11 winding head is employed, the wire feed fingers 45 are moved radially inward to facilitate proper positioning of the wires W into the slots of the gripping and cutting mechanism 14, and then are moved radially outward for the forming of hooks as the chuck shaft is moved from the Fig. 18 to the Fig. 12 position.

It is to be understood that suitable means may be provided to the lefthand side of ring 16 in Fig. 12 to properly align the armature slots with the fingers 18.

In the winding of armatures A having skew slots, the wire feed fingers 18 preferably will be mounted in the ring 16 so that the inner ends thereof are at the same skew angle as the slots, and then, as the armature A is reciprocated, the chuck shaft 10 will be rotated slightly, either by predetermined movement of the gear rack 56 or by the armature itself.

Figure 19:
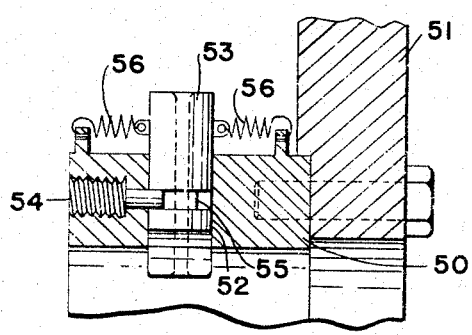
Fig. 19 is a fragmentary cross-section view illustrating a modification in the feed finger assembly in which the feed fingers are rotatable about their longitudinal axes.

With further reference to the winding of armatures having skewed slots therein, a feed finger-ring mechanism as shown in Fig. 19 may be employed. In this case, the feed finger carrier ring 50 is bolted or otherwise secured to the fixed plate 51 of the armature winding machine. Said ring 50 is formed with a plurality of radially disposed holes 52 therethrough in each of which holes a feed finger 53 is mounted and held in predetermined radial position as by means of a set screw 54 provided with an inner end extending into a peripheral groove 55 of said finger. The inner end of each finger is tapered as in Fig. 5 or Fig. 7; but, in this case, each finger 53 is free to be turned about its longitudinal axis and is yieldably held and returned to a straight position with its tapered end parallel to the axis of the armature being wound, as by means of springs 56 which have their opposite ends hooked through ears on the finger and ears formed on the ring as is best shown in Fig. 19.

When a skewed slot armature is moved axially through the ring, the tapered inner ends of the fingers 53 will enter the slots of the armature and as the axial movement continues the fingers will be turned so that the tapered inner ends will now be parallel to the skew slots. In so axially moving the armature, suitable mechanical means may be provided for rotating the armature in accordance with the lead of its skewed slots. However, if desired, the rotary drive for shaft 10 may provide for lost-motion, whereby as the armature is moved axially, it will be rotated in accordance with the lead of the skew slots. In either event, the feed fingers 53 are free to be turned about their longitudinal axis so as to insure free axial movement of the inner ends of the fingers through the armature slots. Of course, this form of ring 50 and feed finger 53 assembly may be employed as well in the winding of straight slot armatures, if desired.

Figure 20:
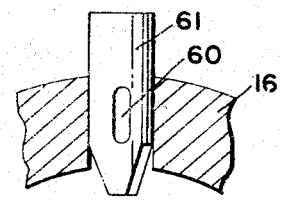
Fig. 20 is a fragmentary cross-section view similar to Fig. 5 except illustrating a feed finger which is mounted in skewed position for winding armatures having skewed slots.

With reference to Fig. 20, this ring 16 structure is essentially the same as that shown in Figs. 4 and 5 with the exception that the key-way 60 in the feed finger 61 in which the end of the set screw 19 is engaged is circumferentially displaced with reference to the inner tapered end of the finger 61, whereby the latter will be disposed and locked in the desired skew position corresponding to the skew angle of the armature slots. Again, as in Fig. 19, the machine may be arranged to positively rotate the armature during the axial strokes thereof or the armature and shaft 10 which grips the same may be provided with a lost motion drive so that the armature may be rotated in accordance with the lead of the skew slots during the axial strokes. For an example of a mechanism for winding skew slot armatures, reference may be had to the previously referred to Hunsdorf Patent No. 2,632,603.

Figure 21:
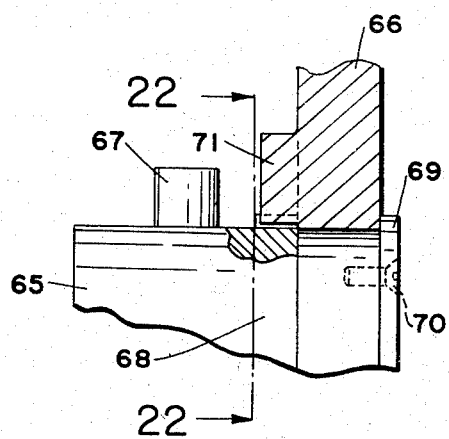
Fig. 21 is a fragmentary cross-section view showing an oscillatory feed finger-ring unit which is adapted to be oscillated responsive to movement of a skewed slot armature therethrough.
Figure 22:
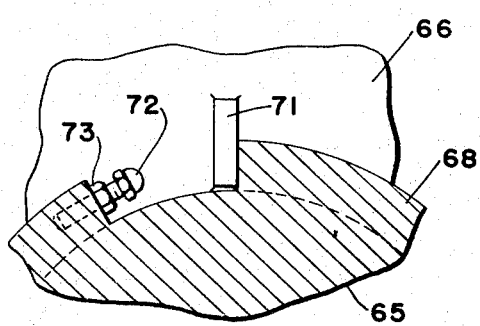
Fig. 22 is a cross-section view taken substantially along the line 22—22, Fig. 21.

In the mechanism illustrated in Figs. 21 and 22, the finger carrier ring 65 is mounted for oscillation about its central longitudinal axis in the fixed plate 66 of the armature winding machine and preferably the fingers 67 carried by said ring 65 are of the type shown in Fig. 20, that is, they are locked with their inner tapered ends in the desired skew position. The oscillatory mounting of the ring 65 may be effected as by the provision of a peripheral collar 68 on said ring engaging one side of the fixed plate 66 and a ring 69 secured by screw 70 or the like to ring 65, said ring 69 projecting radially to overlap the opposite side of said plate 66.

The fixed plate 66 has a stop lug 71 thereon which extends radially into a notch in the peripheral collar 68, and the amount that the ring 65 may rotate during each axial stroke of the armature is adjusted as by means of a screw 72 held in adjusted position by the lock nut 73 and engageable with one side of the stop lug 71.

In this case, the armature being wound is reciprocated axially, without rotational movement, and as a consequence, the entire ring 65 and feed finger 67 assembly rotates with respect to the fixed plate 66 through a predetermined angle as determined by the setting of the adjusting screw 72. After the axial stroke of the armature has been completed, and after the tapered ends of the fingers have disengaged from the skewed armature slots, the armature will be rotated in a direction such that one end of the notch in collar 68 (or the end of the adjusting screw 72) remains in engagement with the stop lug 71 during such roll-over operation. Then, when the armature is moved axially in the opposite direction, the ring 65 and finger 67 assembly will be rotated in the opposite direction in accordance with the lead of the skewed armature slots, and, again, the roll-over will be in a direction to maintain either the end of the notch or the end of the adjusting screw 72, as the case may be, in engagement with the stop lug 71.

When it is desired to wind skew slot armatures with minimum end build-up of the coils, the ring 16, Fig. 20, or the ring 65, Fig. 21, will be provided with axially staggered fingers 61 or 67, respectively, as clearly shown in Fig. 6.

Other modes of applying the principle of the invention may be employed, change being made as regards the details described, provided the features stated in any of the following claims, or the equivalent of such, be employed.

I therefore particularly point out and distinctly claim as my invention:

1. The combination with an armature winding machine of the character wherein a plurality of wire coils are simultaneously wound into the longitudinal wire-receiving slots and across the ends of an armature by alternately reciprocating and rotating a member in which the armature is gripped with respect to a winding throat, of a ring mounted in coaxial relation to said armature gripping member for reciprocation of the armature therethrough, and a plurality of tubular wire feed fingers radially positioned through holes around said ring to extend radially into the armature slots, said fingers having wire feed openings therethrough, some of which are axially offset with respect to the feed openings of others so as to lay wires side by side across the ends of the armature as the latter is rotated by said gripping member.

2. A winding head for an armature winding machine of the character wherein wire coils are wound in the longitudinal slots of an armature by alternate reciprocation and rotation of the latter with respect to said winding head, said winding head comprising a circular ring of inside diameter substantially equal to that of the armature and formed with holes radially therethrough in number and angular relation corresponding to the armature slots, tubular wire-feed fingers radially slidable in such holes, and means positioning said fingers with their inner ends disposed radially inward of the inside diameter of said ring so as to pass through the armature slots during reciprocation of the armature as aforesaid, said fingers having wire feed openings therethrough, some of which are axially offset with respect to the feed openings of others so as to lay wires side by side across the ends of the armature as the latter is rotated with respect to said winding head.

3. The combination with an armature winding machine of the character wherein a plurality of wire coils are simultaneously wound into the longitudinal wire-receiving slots and across the ends of an armature by alternately reciprocating and rotating a member in which the armature is gripped with respect to a winding throat, of a ring mounted in coaxial relation to said armature gripping member for reciprocation of the armature therethrough, a plurality of tubular wire feed fingers radially positioned through holes around said ring to extend radially into the armature slots, said ring being mounted for oscillation responsive to axial reciprocation of a skewed slot armature therethrough, said fingers having wire feed openings therethrough, some of which are axially offset with respect to the feed openings of others so as to lay wires side by side across the ends of the armature as the latter is rotated by said gripping member.

References Cited in the file of this patent

UNITED STATES PATENTS

| | | |
|---|---|---|
| 1,692,114 | Darby | Nov. 20, 1928 |
| 2,509,227 | Gordy | May 30, 1950 |
| 2,561,562 | Collins | July 24, 1951 |
| 2,615,639 | Collins | Oct. 28, 1952 |
| 2,718,359 | Hunsdorf | Sept. 20, 1955 |